Patented Aug. 22, 1933

1,923,375

UNITED STATES PATENT OFFICE 1,923,375

WELDING

Robert W. Holt, Chicago, Ill., assignor, by mesne assignments, to Franklin M. Warden, Chicago, Ill.

No Drawing. Application December 4, 1929
Serial No. 411,679

3 Claims. (Cl. 148—26)

This invention relates to processes of welding, and it particularly relates to processes of arc welding in which a movable electrode is used which does not add material to the weld and in which materials consisting in whole or part of readily oxidizable metals, such as aluminum, are welded together.

One object of the present invention is to provide a new method of fusion welding which permits joining readily oxidizable metals more readily than has heretofore been possible.

Another object is to provide an arc process of fusion welding which will produce deposits of high flexibility and capable of being enameled and readily ground.

A further object is to provide a process of fusion welding which is capable of joining together extremely thin pieces of metal with a minimum of warping or distortion.

Other objects will appear during the course of the following description.

In practicing the present invention, there is utilized a movable electrode of such character and composition that it will not add material to the weld. Preferably the movable electrode consists of a non-metallic or carbon rod. The work, which is the other electrode, or preferably the filler material, which is most satisfactorily in the form of a wire or rod of metal, is provided with a flux material, which is capable of melting and partially or completely vaporizing in the heat of the arc, preferably the former. This flux material may be of such character that its vapors will cause the arc to play steadily on the molten deposit.

The preferred flux will be of such a character as to protect hot deposited metal from contact with the air and not leave any objectionable slag on the weld deposit. A most satisfactory flux is one which will perform a dual function, namely substantially prevent oxidation of the hot and/or molten metal and also dissolve any metal oxide which may be formed. In case of many fluxes, as are illustrated by some of the following examples, the flux is made up in such a manner and composed of such materials that it is easily fusible, and when molten, will have a sufficiently high surface tension to form a coherent blanket over the molten metal, which is not easily blown away, which will not mix or alloy with the fused metal and which will not be easily ruptured by unevenness in the molten metal surface. In addition, when the coating is cold, it should be easily removable from the solidified metal or from the weld. These qualities are especially important in case it is necessary to splice welds, as when one rod burns out and must be replaced by another.

The flux may be introduced into the arc stream in a variety of different ways. Most desirably a filler rod is required and the flux may be applied to the surface of the rod by dipping, brushing, or in some other manner. When a rod is used a thick coating of the flux should be applied thereto. The coating should be of greater thickness than inappreciable residual lubricant or surfacing coatings and in most cases should be as thick as or thicker than full flux coatings. The flux coatings on the rod must be heavy enough to cover the molten deposit behind the arc.

The flux may also be introduced into the arc in other manners, as by means of placing flux impregnated string, cloth or paper upon the work. Or, the flux may be placed upon the work in the form of a powder, or even painted upon the seam or portion of the work which is to receive the weld deposit. When a filler rod is employed, it is desirable to use such a diameter that an inch of seam, if the weld be a seam, is made with an inch of rod. However, large or small diameters may also be utilized and at the same time fusion of the welding rod may be advanced or retarded as the case may be to yield the most satisfactory result.

As stated before, the movable electrode is preferably made of carbon or graphite, but it also may be made of some other material which will not add itself to the weld, such as tungsten. The movable electrode should preferably be pointed during the operation, and it preferable to use self-pointing electrodes in the process of the present invention. Automatically pointing electrodes may be secured in various manners. A size of electrode may be selected which, with a current used in any particular application, will run red hot due to resistance heating. Due to this the electrode will burn away at the surface due to air contact and will burn away most at that portion of the surface adjacent the arc, so that the rod will automatically point itself. In case this method is used of pointing the rod, the slope of the curve forming the point may be determined by regulating the distance from the arc at which contact is made to the holder or other means of connection with the lead cable supplying the current. When a carbon pencil is used, the surface thereof may be pointed or impregnated with some material which will cause the carbon to burn more rapidly on the surface than upon the inside. Some materials which will function in this manner are oxidizing agents such as chlorates or permanganates. If necessary the rod may be mechanically sharpened each time the end burns dull.

Among some of the materials which may be readily welded by the present invention are aluminum and its alloys, and alloys of chromium, vanadium, tungsten and other similar readily oxidizable metals. It may also be applied to iron and steel and their alloys. The welding process of the present invention may be applied to sheet aluminum, to aluminum tubing, to aluminum aeroplane parts and to other materials consisting in part or whole of aluminum. Duraluminum and manganese and silicon alloys have also been very satisfactorily welded by the process of the present invention. Since each of these metals and alloys will give different characteristics to the arc and also different conductances to the arc vapors, it is necessary to vary somewhat the character and composition of the flux, which is to be used with the different materials. The flux vapors not only must be regulated to compensate for the resistance of the vapors from the different metals but also must be regulated so that it will be possible to have the desirable heat intensities for the different classes of work. Some of the materials require higher heat intensities than others.

In general, compounds of the alkali metals have been found to be most satisfactory fluxes for the purpose of the present invention. The preferred alkali metal compounds are the halides, especially the chlorides and fluorides of potassium and sodium. Usually it is desirable to use a mixture of these materials, and in the preferred composition there are present both sodium and potassium salt and both fluorides and chlorides. It has also been found advantageous to add salts or compounds of aluminum. Aluminum fluoride, either by itself or in combination with sodium fluoride as cryolite, has been found to be a very satisfactory addition. The addition of oxides or carbonates of alkaline earth metals, such as magnesium oxides and the addition of carbonaceous materials, such as lampblack or graphite, have also been made with excellent results. A major portion of the flux composition usually consists of alkali metal halides, and this proportion will often run up to from 70 to 90% of the flux composition. When both chlorides and the fluorides are used, the chlorides are usually employed in larger quantities than the fluorides, the proportion of chlorides to fluorides being about two to one or more. If an alkaline earth compound and/or a carbonaceous material is used, they should only constitute a minor portion of the flux mixture.

The following flux compositions are but specific examples of one embodiment of the invention and are by no means restrictive. These flux compositions are especially adapted to be applied to the welding of aluminum and its alloys:

I

| | Grams |
|---|---|
| Sodium aluminum fluoride | 6.03 |
| Carbon | .25 |
| Sodium fluoride | 2.04 |
| Sodium chloride | 14.00 |
| Potassium chloride | 8.75 |
| Potassium fluoride | .20 |
| Magnesium oxide | 1.45 |

II

| | Grams |
|---|---|
| Sodium aluminum fluoride | 6.15 |
| Potassium chloride | 20.57 |

III

| | Grams |
|---|---|
| Sodium fluoride | 5.48 |
| Potassium chloride | 20.57 |

IV

| | Grams |
|---|---|
| Sodium chloride | 55. |
| Potassium chloride | 35. |
| Sodium fluoride | 7. |
| Potassium fluoride | .4 |
| Magnesium oxide | 2.8 |

V

| | Grams |
|---|---|
| Sodium fluoride | 1.74 |
| Sodium chloride | 14.00 |
| Potassium chloride | 8.75 |
| Potassium fluoride | .20 |
| Magnesium oxide | 1.45 |
| Carbon | 1.11 |

Formula I above has been employed very satisfactorily with the welding of straight running seams, and it has been found to be the best mixture for aluminum. The proportions of this formula may be varied within the following ranges—3 to 11 parts of sodium aluminum fluoride, zero to 2 parts of carbon, zero to 4 parts of sodium fluoride, 8 to 20 parts of sodium chloride, 5 to 12 parts of potassium chloride, and zero to 2 parts of magnesium oxide. Magnesium oxide may be replaced by an oxide of one or more rare earths. The formula given is a balanced mixture, and if variations as indicated above are made in the amounts of one or more of the ingredients, the amounts of the other ingredients must be balanced to coact properly with such changed amounts. Formulas II and III may also be employed in connection with the welding of aluminum, but greater care must be exercised. The addition of some finely divided carbon assists the weld assisting action of these last two mentioned formulas. Formulas IV and V are also very excellent, and Formula V is especially adapted to be utilized for the welding together of ends. The carbon may be present in the form of either amorphous lampblack or graphite, and the sodium aluminum fluoride is usually in the form of cryolite, a naturally occurring mineral. The mixtures specified above may be readily attached to filler rods or wire without the use of an adhesive, since they appear somewhat deliquescent and form a pasty, adhesive mixture. The most important and essential ingredients are alkali metal fluorides and chlorides, particularly the latter. In the less preferred mixtures all other ingredients may be omitted. In the preferred formula sodium aluminum fluoride serves as a solvent of the metal oxides, such as alumina. The alkali metal fluoride, for example sodium fluoride, tends to increase the surface tension, causing the flux to act like a protecting blanket. If a little globule of the molten metal heaps up, the covering will not be ruptured due to these characteristics. The alkali metal chlorides appear to reduce the melting point of the flux mixture so that it is readily fusible, while magnesium oxide and rare earth oxides seem to inhibit grain growth in the deposited metal.

The present invention combines many of the advantages of gas welding and electric welding and at the same time eliminates many of the disadvantages of both processes. The heat may be even more readily directed than with a gas welding torch and at the same time the welding operation partakes of the lower cost of electric welding. The process of the present invention will accomplish all the work done by either of the other two processes in a much better way and much more cheaply, and will also permit doing work which neither of the prior methods have utilized commercially with success. In ordinary methods of welding with a carbon arc, there is usually a drop of 30 to 40 volts across the arc.

With the process of the present invention, however, this drop frequently is less. The molten metal is protected from air contact, since it does not have to pass through the arc as is the case with metallic filler rods. Nor is the flux entirely burned away. Sufficient of the flux material will remain to protect the deposit. Supposedly due to the oxide and nitride contents of arc welds, they are not always as ductile as gas welds nor do they take coats of enamel as readily. The welds made according to the present invention are fully the equal of gas welds in both these respects. When working in deep crevices, the metallic arc or ordinary carbon arc generally becomes unmanageable, while in the case of the gas torch too much heat is evolved. All these disadvantages are eliminated by the welding process of the present invention because the heat of the arc is concentrated in a very small area, as a result of which much less warping will take place. The weld deposit is very soft, so that the excess metal is readily ground away if the bead is undesirable and must be removed.

What is claimed is:

1. A flux composition comprising 3 to 11 parts of sodium aluminum fluoride, carbon in the proportion of not more than substantially two parts, sodium fluoride in the proportion of not more than substantially 4 parts, sodium chloride in the proportion of substantially 8 to 20 parts, potassium chloride in the proportion of substantially 5 to 12 parts, and magnesium oxide in the proportion of not more than substantially 2 parts.

2. A flux composition for welding aluminum, comprising a mixture containing substantially 70 to 90 per cent alkali metal chlorides and alkali metal fluorides, the major portion of said 70 to 90 per cent being alkali metal chlorides, and the remainder of said mixture containing magnesium oxide and a carbonaceous material.

3. A flux composition, comprising a mixture containing substantially 16 to 47 parts of a mixture of alkali metal fluorides and chlorides, the alkali metal chlorides being present in an amount at least substantially twice as great as the amount of fluorides, and magnesium oxide in the proportion of not more than substantially 2 parts.

ROBERT W. HOLT.